(12) United States Patent
Paulat et al.

(10) Patent No.: US 8,864,056 B2
(45) Date of Patent: Oct. 21, 2014

(54) LOW-PRESSURE MILLING PROCESS

(75) Inventors: Florian Paulat, Bruehl (DE);
Gottlieb-Georg Lindner, Bonn (DE);
Karl Meier, Alfter (DE)

(73) Assignee: Evonik Degussa GmbH, Essen (DE)

( * ) Notice: Subject to any disclaimer, the term of this patent is extended or adjusted under 35 U.S.C. 154(b) by 773 days.

(21) Appl. No.: 12/892,520

(22) Filed: Sep. 28, 2010

(65) Prior Publication Data
US 2011/0073689 A1 Mar. 31, 2011

(30) Foreign Application Priority Data
Sep. 29, 2009 (DE) .......................... 10 2009 045 116

(51) Int. Cl.
*B02C 19/06* (2006.01)

(52) U.S. Cl.
CPC ...................................... *B02C 19/06* (2013.01)
USPC .................................... 241/5; 241/19; 241/23

(58) Field of Classification Search
USPC ........................................ 241/5, 39, 40, 23, 19
See application file for complete search history.

(56) References Cited

U.S. PATENT DOCUMENTS

| | | | |
|---|---|---|---|
| 5,244,481 A | 9/1993 | Nied | |
| 5,252,110 A | 10/1993 | Nied | |
| 7,264,183 B2 * | 9/2007 | Nyssen et al. | 241/5 |
| 7,285,330 B2 | 10/2007 | Meyer et al. | |
| 7,303,624 B2 | 12/2007 | Meyer et al. | |
| 7,402,293 B2 | 7/2008 | Meyer et al. | |
| 7,553,889 B2 | 6/2009 | Christian et al. | |
| 2004/0118007 A1 | 6/2004 | Chickering, III et al. | |
| 2004/0120876 A1 | 6/2004 | Meyer et al. | |
| 2004/0121156 A1 | 6/2004 | Meyer et al. | |
| 2004/0127604 A1 | 7/2004 | Meyer et al. | |
| 2004/0249049 A1 | 12/2004 | Christian et al. | |
| 2008/0139756 A1 | 6/2008 | Christian et al. | |
| 2009/0294557 A1 | 12/2009 | Nied | |

FOREIGN PATENT DOCUMENTS

| | | |
|---|---|---|
| CN | 1319118 A | 10/2001 |
| CN | 1706553 A | 12/2005 |
| CN | 1726009 A | 1/2006 |
| CN | 1887972 A | 1/2007 |
| DE | 19824062 A1 | 12/1999 |
| DE | 102006023193 A1 | 11/2007 |
| EP | 0472930 A2 | 3/1992 |
| EP | 0999230 A2 | 5/2000 |
| EP | 1477457 B1 | 7/2007 |
| JP | H10167968 (A) | 6/1998 |
| JP | 2006514044 (A) | 4/2006 |

(Continued)

OTHER PUBLICATIONS

Office Action issued Jul. 15, 2013, in Taiwanese Application No. 099132400 (with English-language Translation).
Office Action issued Aug. 9, 2013, in Chinese Application No. 201010290438.X (with partial English-language Translation).

(Continued)

*Primary Examiner* — Mark Rosenbaum
(74) *Attorney, Agent, or Firm* — Oblon, Spivak, McClelland, Maier & Neustadt, L.L.P.

(57) ABSTRACT

The present invention provides a process for generating fine particles in a jet mill which operates at a pressure of a milling gas of less than or equal to 4 bar in abs value and a temperature of the mill of less than 100° C., a process for simultaneous milling and surface modifications of the fine particles, a jet mill for operating the process and products obtained by the process.

11 Claims, 3 Drawing Sheets

(56) References Cited

FOREIGN PATENT DOCUMENTS

| | | |
|---|---|---|
| JP | 2006514879 (A) | 5/2006 |
| JP | 2007038221 (A) | 2/2007 |
| JP | 2009518664 (A) | 5/2009 |
| JP | 2009537292 (A) | 10/2009 |
| WO | WO 2004/ 054927 A1 | 7/2004 |
| WO | WO 2004/055105 A1 | 7/2004 |
| WO | WO 2004/055120 A1 | 7/2004 |
| WO | WO 2004/060344 A2 | 7/2004 |
| WO | WO 2008/046404 A1 | 4/2008 |

OTHER PUBLICATIONS

Office Action issued Aug. 2, 2013, in Korean Application No. 10-2010-93601(with English-language Translation).

Combined Office Action and Search Report issued Dec. 6, 2013 in Taiwanese Patent Application No. 099132400 submitting English translation only.

Combined Office Action and Search Report issued Dec. 18, 2013 in Chinese Patent Application No. 201210245466.9 (with English translation).

Office Action issued Jul. 22, 2014, in Japanese Application No. 2010-218236 (with English-language Translation).

* cited by examiner

LOW-PRESSURE MILLING PROCESS

CROSS-REFERENCE TO RELATED APPLICATIONS

This application claims priority to German Application No. 102009045116.1, filed Sep. 29, 2009, the disclosure of which is incorporated herein, by reference in its entirety.

BACKGROUND OF THE INVENTION

1. Field of the Invention

The present invention relates to a novel jet mill, a process for generating fine particles by means of a jet mill, a process for simultaneous surface modification of the fine particles and also the products produced by this process.

2. Description of the Related Art

In milling operations performed by means of jet mills, the material to be milled and/or to be classified comprises relatively coarse and relatively fine particles, which are entrained in an air stream and form the product stream, which can be introduced into a housing of an air classifier of the jet mill. The product stream passes in the radial direction into a classifying wheel of the air classifier. In the classifying wheel, the relatively coarse particles are separated from the air stream and the air stream leaves the classifying wheel with the fine particles axially through an outflow pipe. The air stream with the fine particles to be filtered out or to be produced may then be fed to a filter, in which a fluid, such as for example air, and fine particles are separated from one another.

DE 198 24 062 A1 discloses such a jet mill, in the milling chamber of which furthermore at least one high-energy milling jet of hot steam is introduced with high flow energy, the milling chamber having in addition to the inlet device for the at least one milling jet an inlet for the material for milling and an outlet for the product, and, in the region where the material for milling and at least one milling jet of hot steam come together, and material for milling have at least approximately the same temperature.

Furthermore, a corresponding air classifier, in particular for a jet mill, is disclosed for example by EP 0 472 930 B1. This air classifier and the way in which it operates are extremely satisfactory in principle.

The aforementioned processes have the disadvantage that they can only be operated with great expenditure on apparatus and, moreover, are very energy-intensive. In order to minimize this problem, DE 10 2006 023 193 proposes a process in which the milling pressure is lowered below 4.5 bar. This process is more energy-efficient, but has the disadvantage that, as before, there are high temperatures of the operating medium (milling gas). For generating the pressure of the operating medium and the temperature of the operating medium, DE 10 2006 023 193 refers, for example, to DE 198 24 062 or proposes the use of a compressor.

As an alternative to jet mills, the use of mechanical or classifying mechanical mills is known. However, these mills have the disadvantage that the material for milling causes great abrasion on the mill as a result of the direct contact with the rotor/stator. This in turn leads to high maintenance costs for the mill, but at the same time also to undesired contamination of the material from milling.

DETAILED DESCRIPTION OF THE INVENTION

Figure 1:
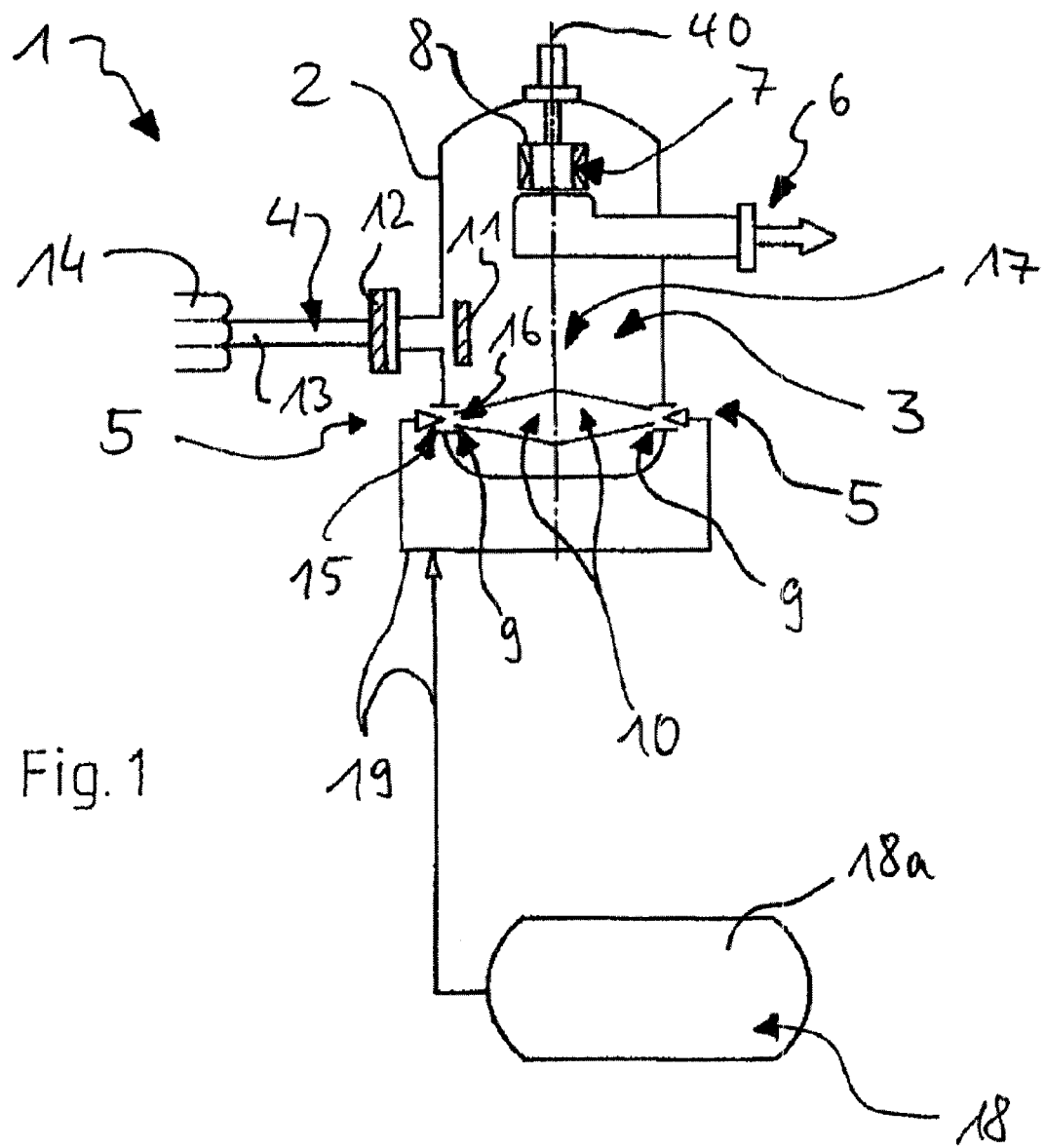
FIG. 1 shows an exemplary embodiment of a jet mill in a partially sectional schematic drawing.

An object of the present invention was therefore to provide a milling process that is as energy-efficient as possible and leads to less contamination of the material from milling in comparison with milling with a mechanical or classifying mechanical mill. In a specific object, the aim was for the grain distribution of the material from milling by the new process to be at least equivalent or better than in the case of milling processes with mechanical or classifying mechanical mills.

A specific object of the present invention was to provide a milling process that is as energy-efficient as possible, leads to less contamination of the material from milling in comparison with milling with a mechanical or classifying mechanical mill and makes it possible to carry out a surface modification of the material for milling (for example coating, doping) during the milling.

A further object was to provide novel powdery materials which have low contamination, for example with iron.

These and other objects have been achieved by the present invention, the first embodiment of which provides a process for generating fine particles of a material, comprising: milling the material in a jet mill, wherein a pressure of a milling gas is less than or equal to 4 bar absolute (abs) and a temperature of the mill is less than 100° C.

In a second embodiment, the present invention provides a process for generating fine particles of a material, comprising: milling the material in a jet mill, wherein a pressure of a milling gas is less than or equal to 4 bar (abs) and a temperature of the mill is less than 100° C. and wherein the pressure and temperature are generated by a rotary blower or a radial blower.

In a third embodiment the present invention provides process for generating coated fine particles of a material, comprising: milling the material in a jet mill, and adding a coating agent or doping agent to the milling; wherein a pressure of a milling gas is less than or equal to 4 bar (abs) and a temperature of the mill is less than 100° C. and at least a part of a surface of the particles of the material for milling are covered with the coating agent or doping agent.

Within the context of the present invention, all ranges below include explicitly all subvalues between the upper and lower limits.

The inventors have surprisingly discovered that it is possible to mill inorganic and organic materials in a jet mill at pressures less than 4 bar and at temperatures of less than 100° C. in such a way that they subsequently have a particle range that at least corresponds to that obtained if the identical material had been milled in a conventional mill with a rotor/stator (classifying and non-classifying). Consequently, products with the same particle range conventionally obtained but with lower impurity content may be produced.

As a result of the gentle milling conditions of the invention, it may also be possible to produce particles with a reduced fines content and/or narrower particle size distribution in comparison with mechanical mills.

Furthermore, the inventors have discovered that it may also be possible according to the process of the present invention to coat or dope the material for milling at the same time as the milling because the pressure and temperature in the process according to the invention are quite low. This is worthy of mention in particular because it is not possible in mechanical or classifying mechanical mills to carry out coating or doping at the same time as the milling, since caking generally occurs on the rotor/stator/walls of the mill.

The low pressure and the low temperature according to the process of the present invention may also allow the use temperature-sensitive surface modifying agents and allow milling of temperature-sensitive materials, such as for example, sugar. Such utilities are not possible in conventional jet milling processes.

Furthermore, the comparatively gentle conditions employed in the dry milling and coating process according to the invention may allow production of products that can not be produced by conventional processes. For example, the milling and simultaneous coating of silicas with silicone polyether acrylate polymers may be possible without the loss of polyether content associated with conventional processes. For production reasons, these polymers sometimes have a 10-20% by weight excess of polyether. It has been found that, in the case of classic wet milling, this excess is partly washed out. Surprisingly, the polyether excess is retained in the dry milling process according to the invention, and completely different coating of the silica particles may be produced. This may result in improved application properties of the particles obtained according to the process of the present invention. Additionally, ecological and economic advantages may be obtained, since contamination of effluents with polyethers may be significantly reduced or avoided.

In particular, in the milling of highly abrasive solids, for example, materials for dental care, the process according to the invention may provide particular advantages. These substances cause a particularly high amount of abrasive matter on the mill, while at the same time products for human and animal cosmetic treatments must meet high requirements with regard to the impurity content.

In a further preferred embodiment of the present invention a process for generating fine particles in a jet mill (1) using compressed gases as the milling gas, wherein the milling gas has a pressure of ≤4 bar (abs) and a temperature of less than 100° C. and, during the milling, a coating agent or doping agent is added in such a way that at least parts of the surface of the particles of the material for milling are covered with the coating agent or doping agent is provided.

In another embodiment, the present invention provides a jet mill, preferably a fluidized-bed, opposed-jet mill, a dense-bed jet mill, an oval tube mill or a spiral jet mill, having a blower, preferably a rotary blower or a radial blower, for generating the pressure of the operating medium.

The process according to the invention may provide an energy-optimized process in comparison with the conventionally known processes due to the low pressure, low temperature, low wearing of the mill, and reduced expenditure on apparatus which may be obtained according to the claimed process.

The jet mill according to the invention and used with preference in the process according to the invention may have the great advantage over the conventional jet mills that it does not require a compressor or pressure vessel to generate the pressure and the temperature of the operating medium, but rather a simple blower, preferably a rotary blower or a radial blower, may be used. This may considerably reduce the expenditure on apparatus, lower the procurement costs and reduce the maintenance costs associated with the process of the invention. The maintenance costs may also be reduced as a result of the low temperatures and pressures employed in the process according to the invention.

An additional advantage of the process according to the invention is that the process may be employed with already existing jet mills.

The grain distribution of the products milled with the process according to the invention, as indicated by the $d_{50}$ value, can be set analogous to the grain distribution obtained by means of a mechanical or classifying mechanical mill. However, as a result of the more efficient energy conversion, the fines content in the material from milling according to the invention can be significantly reduced—in comparison with milling by means of a mechanical or classifying mechanical mill. As a result, the materials for milling according to the invention may have significantly improved application properties, for example reduced thickening effect. A further advantage of the materials for milling according to the invention may be their significantly lower contamination with abrasive products of the mill—in comparison with materials from milling that have been generated by mechanical or classifying mechanical mills. This is very advantageous in particular in the case of products that must have a high degree of purity.

As previously indicated, coating or doping of the material for milling may be combined with the milling in the process according to the invention. This is advantageous because this coating or doping can be performed at the low temperatures of less than 100° C., and consequently coating agents or doping agents or materials for milling that are temperature-sensitive (for example sugar, trimethylol propane, Tego® Rad 2300, etc.) may be used.

The process according to the invention represents a gentle milling process with which the physicochemical properties of the material for milling, such as for example the DBP absorption, are largely retained.

Finally, it may be mentioned as an advantage that the process according to the invention may be used universally, i.e. both for organic substances and for inorganic substances. In this way, the process differs, for example, from the process described by DE 10 2006 023 193, which can only be used for certain inorganic substances.

Preferred and/or advantageous modifications of the invention may be recognized from the claims and combinations thereof as well as from the present application documents as a whole. The invention is explained in more detail on the basis of the exemplary embodiments and application examples described below and represented in the drawings merely by way of example, i.e. it is not restricted to these exemplary embodiments and application examples or to the respective combinations of features within the individual exemplary embodiments and application examples. Process and device features also respectively emerge analogously from descriptions of the device and the process.

Individual features that are specified and/or represented in connection with actual exemplary embodiments are not restricted to these exemplary embodiments or the combination with the other features of these exemplary embodiments but may be combined with any other variants within the limits of technical feasibility, even if they are not separately discussed in the present documents.

The same designations in individual figures and illustrations of the drawings identify components that are the same or similar or have the same or similar effects. Features that are not provided with designations also become clear from the representations in the drawing, irrespective of whether or not such features are described below. On the other hand, features that are contained in the present description but cannot be seen or are not represented in the drawing can also be readily comprehended by a person skilled in the art.

In the case of the process for generating fine particles by means of a jet mill, the new steps provided by the present invention are so clear and comprehensible that there is no need for the individual steps to be graphically represented.

The process according to the invention is a process for generating fine particles by means of a jet mill using compressed gases as the milling gas, wherein the milling gas has a pressure of ≤4 bar (abs) and a temperature of less than 100° C.

The process may preferably be further developed by the temperature of the milling gas being less than or equal to 95° C., with preference less than or equal to 90° C., with particular preference less than or equal to 80° C. and with most particular preference from 15 to 80° C. In a first specifically preferred variant the temperature of the milling gas is 50 to 80° C. and in a second specifically preferred variant it is 15 to 50° C. The temperature of the milling gas is measured at the inlet of the milling gas into the mill.

The pressure of the milling gas is preferably less than 3 bar, with particular preference less than 2 bar, with most particular preference less than 1 bar, with specific preference 0.5 to 1 bar and with most specific preference 0.15 to 0.5 bar.

The following combinations of milling gas pressure and temperature are particularly preferred: 0.15 to 0.5 bar and 15 to 50° C. and 0.15 to 0.5 bar and 50 to 80° C. Examples of this are the combinations 0.3 bar and 20° C. and 0.4 bar and 75° C.

In the process according to the invention, both organic substances and inorganic substances can be milled. Examples of organic substances are carbohydrates (for example sugar) and carboxymethyl cellulose.

Preferred inorganic substances are amorphous and crystalline inorganic solids. The crystalline inorganic solids are with preference titanium dioxide, aluminium oxide and calcium carbonate and the amorphous solids are with preference gels but also other types of amorphous solids. Also preferred are amorphous and crystalline inorganic solids such as ceramic (for example sintered ceramic). With particular preference, they are solids containing or comprising at least one metal and/or metal oxide, in particular amorphous oxides of metals of the third and fourth main groups of the periodic table of elements. This applies both to the gels and to the amorphous solids with a different kind of structure. Particularly preferred are precipitated silicas, pyrogenic silicas, silicates, aluminosilicates, electric arc silica, for example Amosil from Quarzwerke GmbH, glasses and silica gels, with silica gels comprising not only hydrogels but also aerogels and xerogels.

Preferably, a fluidized-bed opposed-jet mill or a dense-bed jet mill is used in the process according to the invention.

In principle, any substance or substance mixture that is gaseous under the operating conditions may be used as the operating medium for forming the milling jets that are introduced, the term operating medium being used within the scope of the present invention synonymously with the term milling gas. Used with particular preference are air and/or hydrogen gas and/or argon and/or noble gases, such as for example helium and/or nitrogen and/or a mixture of the operating media mentioned. Air is most particularly preferred. The use of inertizing gases is preferred in particular in the milling of oxidation-sensitive or organic materials for milling.

A pressure tank or a compressor, such as are present in conventional jet mill apparatuses, may be used for forming the milling jet. In a specific embodiment of the present invention, however, the pressure of the milling jet may be generated by a blower, with particular preference a rotary blower or radial fan. As a result, both the investment costs and the operating and maintenance costs of the milling apparatus may be significantly lowered. This specific new jet mill with a blower for generating the milling jet is an embodiment of the present invention.

The jet mill may be preferably connected to a classifier, which may be an internal classifier or an external classifier. In a preferred embodiment, a dynamic air classifier integrated into the jet mill is used. The air classifier may contain a classifying rotor or a classifying wheel with a clearance height that is constant or increases with decreasing radius, so that the surface area of the classifying rotor or wheel that the milled stream passes through during operation is approximately constant. Alternatively or in addition, it may be provided that the air classifier includes a classifying rotor or a classifying wheel with an immersion tube which is designed in such a way that, when the classifying rotor or the classifying wheel rotates, it rotates along with it.

A further preferred embodiment of the process is that of providing a fines outlet chamber, which has a cross-sectional widening in the direction of flow.

FIG. 1 schematically represents an exemplary embodiment of a jet mill 1 for carrying out the process as explained above. As already set out above, the process according to the invention can be readily realized with equipment and means that are known per se to a person skilled in the art, although this is not intended to suggest that a person skilled in the art would also know the individual steps of the process that has been newly created by the present invention.

The jet mill 1 according to FIG. 1 includes a cylindrical housing 2, which encloses a milling chamber 3, a material-for-milling feed 4 approximately halfway up the milling chamber 3, at least one milling jet inlet 5 in the lower region of the milling chamber 3 and a product outlet 6 in the upper region of the milling chamber 3. An air classifier 7 with a rotatable classifying wheel 8, with which the material from milling (not shown) is classified, provides for the discharge of material from milling below a specific grain size out of the milling chamber 3 through the product outlet 6 and for the feed of material from milling with a grain size above the selected value back for a further milling operation.

The classifying wheel 8 may be a classifying wheel that is customary in air classifiers, the blades of which (see later, for example in connection with FIG. 3) delimits radially extending blade channels, at the outer ends of which the classifying air enters and particles of relatively small grain size or mass are entrained to the central outlet and to the product outlet 6, while relatively large particles or particles of relatively large mass are deflected away under the influence of centrifugal force. In particular, the air classifier 7 and/or at least the classifying wheel 8 thereof are provided with at least one design feature according to EP 0 472 930 B1.

It may be that only one material-for-milling inlet 5 is provided, for example comprising a single, radially directed inlet opening or inlet nozzle 9, in order that a single milling jet 10 impinges with high energy on the particles of the material for milling that arrive in the region of the milling jet 10 from the material-for-milling feed 4 and make the particles of the material for milling break up into smaller subparticles, which are sucked in by the classifying wheel 8 and, if they are of an appropriately small size or mass, are transported to the outside through the product outlet 6. However, a better effect may be achieved with pairs of diametrically opposite material-for-milling inlets 5, which form two milling jets 10 colliding with one another, which bring about the particle breakdown more intensively than is possible with only one milling jet 10. A multiple number of pairs of jet mills providing colliding jets may be employed, depending on the size and configuration of the mill.

Furthermore, it is possible for example to influence the processing temperature by using an internal heating source 11 between the material-for-milling feed 4 and the region of the milling jets 10 or a corresponding heating source 12 in the region outside the material-for-milling feed 4 or by processing particles of a material for milling that is in any case already warm, which avoids heat losses when it enters the material-for-milling feed 4, for which purpose a feeding pipe 13 is surrounded by a temperature-insulating jacket 14. The heating source 11 or 12, if used, may in principle be of any kind desired and therefore be suitable for use specifically for the intended purpose and chosen according to availability on the market, as would be understood by one of ordinary skill in the art.

The temperature of the milling jet or the milling jets 10 may be set according to the properties of the material to be milled and the temperature of the material for milling should correspond at least approximately to this milling jet temperature.

Any substance or substance mixture that is gaseous under the operating conditions may be used for forming the milling jets 10 that are introduced into the milling chamber 3 via milling jet inlets 5. Air and/or hydrogen gas and/or argon and/or noble gases, such as for example helium, and/or nitrogen and/or a mixture of the operating media may be preferred. The heat content of the operating medium after the inlet nozzle 9 of the respective milling jet inlet 5 should not be significantly less than before this inlet nozzle 9. Because the energy necessary for impact comminution is to be available primarily as flow energy, the pressure drop between the inlet 15 of the inlet nozzle 9 and the outlet 16 thereof will be considerable in comparison (the pressure energy will be converted to the greatest extent into flow energy) and the temperature drop will also be not inconsiderable. This temperature drop in particular should be compensated by the heating of the material for milling to such an extent that the material for milling and the milling jet 10 have the same temperature in the region of the center 17 of the milling chamber 3 when there are at least two milling jets 10 meeting one another or a multiple of two milling jets 10.

Methods of designing and implementing the preparation of the milling jet 10 are known to a person skilled in the art.

In the representation of the present exemplary embodiment of the jet mill 1, a reservoir or generating device 18, such as for example a tank 18*a*, from which the operating medium B is directed by way of directing devices 19 to the milling jet inlet 5 or the milling jet inlets 5 to form the milling jet 10 or the milling jets 10, is representative of any supply of an operating medium B. Instead of the tank 18*a*, it is also possible, for example, for a compressor to be used to make appropriate operating medium B available. Particularly preferred, however, is a simple blower, such as a rotary blower or radial fan.

In particular on the basis of a jet mill 1 provided with an air classifier 7 of this type, where the relevant exemplary embodiments are only intended as exemplary and not as restrictive and should be understood as such, a process for generating fine particles is carried out with this jet mill 1 with an integrated dynamic air classifier 7. A fluid or gas, preferably hydrogen, helium or simply air may generally be used as the operating medium B.

Furthermore, it is advantageous, and therefore preferred, that the classifying rotor 8 has a clearance height that is constant or increases with decreasing radius, that is to say towards its axis, the surface area of the classifying rotor 8 through which the jet mill stream passes being constant. In addition or alternatively, a fines outlet chamber, which has a cross-sectional widening in the direction of flow, may be provided.

In a particularly preferred embodiment, the jet mill 1 contains a classifying rotor 8 which has an exchangeable, co-rotating immersion tube 20.

Further details and variants of exemplary embodiments of the jet mill 1 and components thereof are explained below with reference to FIG. 2 and FIG. 3.

Figure 2:
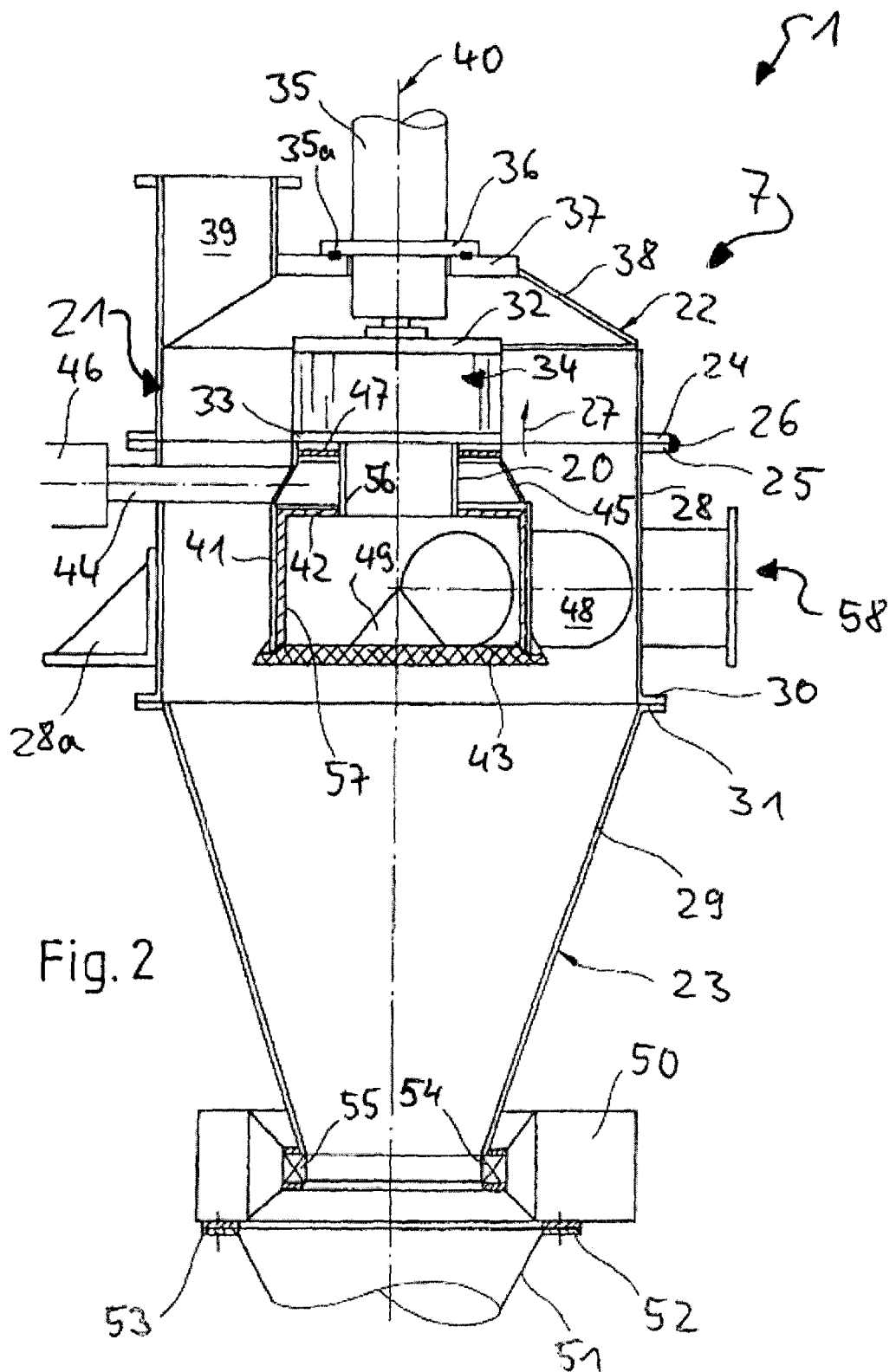
FIG. 2 shows an exemplary embodiment of an air classifier of a jet mill in a vertical arrangement and as a schematic centre-longitudinal section. An outlet pipe is attached to the classifying wheel.

As can be seen from the schematic representation in FIG. 2, the jet mill 1 may include an integrated air classifier 7, which, when the jet mill 1 is designed for example as a fluidized-bed opposed-jet mill or as a dense-bed jet mill, is a dynamic air classifier 7, which is advantageously arranged in the centre of the milling chamber 3 of the jet mill 1. The targeted fineness of the material from milling may be influenced in dependence on the volumetric flow of the milling gas and the rotational speed of the classifier.

In the case of the air classifier 7 of the jet mill 1 according to FIG. 2, the entire vertical air classifier 7 is enclosed by a classifier housing 21, which substantially comprises the upper housing part 22 and the lower housing part 23. The upper housing part 22 and the lower housing part 23 are each provided at the upper and lower peripheries with an outwardly directed circumferential flange 24 and 25, respectively. In the installed or functional state of the air classifier 8, the two circumferential flanges 24, 25 lie on one another and are fixed with respect to one another by suitable means. Suitable means for fixing are, for example, screw connections (not shown). Clamps (not shown) or the like may also serve as releasable fastening means.

At virtually any desired location of the flange circumference, the two circumferential flanges 24 and 25 are connected to one another by an articulated joint 26 in such a way that, after releasing the flange connecting means, the upper housing part 22 can be pivoted upwards in the direction of the arrow 27 with respect to the lower housing part 23 and the upper housing part 22 is accessible from below and the lower housing part 23 is accessible from above. The lower housing part 23 is for its part a two-part form and substantially comprises the cylindrical classifying chamber housing 28 with the circumferential flange 25 at its upper open end and a discharge cone 29, which conically tapers downwards. The discharge cone 29 and the classifying chamber housing 28 lie on one another at the upper and lower ends with flanges 30, 31, and, in the same way as the circumferential flanges 24, 25, the two flanges 30, 31 of the discharge cone 29 and the classifying chamber housing 28 are connected to one another by releasable fastening means (not shown). The classifier housing 21 assembled in this way is suspended in or on carrying arms 28*a*, a number of which are distributed around the circumference of the classifier or compressor housing 21 of the air classifier 7 of the jet mill 1, spaced apart as uniformly as possible, and act on the cylindrical classifying chamber housing 28.

Another important part of the internal housing components of the air classifier 7 is the classifying wheel 8 with an upper cover plate 32, with a lower cover plate 33 on the outflow side, at an axial distance from the said upper cover plate, and with blades 34 of an expedient contour arranged between the outer peripheries of the two cover plates 32 and 33, securely connected to said plates and distributed uniformly around the circumference of the classifying wheel 8. In the case of this air classifier 7, the drive of the classifying wheel 8 is provided by way of the upper cover plate 32, while the lower cover plate 33 is the cover plate on the outflow side. The mounting of the classifying wheel 8 comprises an expediently positively driven classifying wheel shaft 35, which with the upper end is led out of the classifier housing 21 and with its lower end supports the classifying wheel 8 non-rotatably in an overhung bearing within the classifier housing 21. The exit of the classifying wheel shaft 35 from the classifier housing 21 takes place in a pair of machined plates 36, 37, which close the classifier housing 21 at the upper end of a housing end portion 38 in the form of a truncated cone at the top, guide the classifying wheel shaft 35 and seal this shaft passage without hindering the rotational movements of the classifying wheel shaft 35. Expediently, the upper plate 36 may be assigned as a flange non-rotatably to the classifying wheel shaft 35 and be supported non-rotatably by way of rotary bearing 35a on the lower plate 37, which for its part is assigned to a housing end portion 38. The underside of the cover plate 33 on the outflow side lies in the common plane between the circumferential flanges 24 and 25, so that the classifying wheel 8 is arranged in its entirety within the hinged upper housing part 22. In the region of the conical end portion 38, the upper housing part 22 also has a tubular product feed port 39 of the material-for-milling feed 4, the longitudinal axis of which port extends parallel to the axis of rotation 40 of the classifying wheel 8 and the drive or classifying wheel shaft 35 thereof and which port is arranged radially on the outside of the upper housing part 22, as far away as possible from this axis of rotation 40 of the classifying wheel 8 and the drive or classifying wheel shaft 35 thereof.

The classifier housing 21 receives the tubular outlet port 20, which is arranged coaxially with the classifying wheel 8 and lies with its upper end just below the cover plate 33 on the outflow side, but without being connected to it. Disposed coaxially at the lower end of the outlet port 20 formed as a pipe is an outlet chamber 41, which is likewise tubular, but the diameter of which is much greater than the diameter of the outlet port 20 and, in the case of the present exemplary embodiment, is at least twice the diameter of the outlet port 20. At the transition between the outlet port 20 and the outlet chamber 41, there is therefore a significant change in diameter. The outlet port 20 is inserted into an upper cover plate 42 of the outlet chamber 41. At the bottom, the outlet chamber 41 is closed by a removable cover 43. The assembly comprising the outlet port 20 and the outlet chamber 41 is held in a number of carrying arms 44, which are distributed uniformly in a star-like manner around the circumference of the assembly, are securely connected at their inner ends to the assembly in the region of the outlet port 20 and are secured with their outer ends to the classifier housing 21.

The outlet port 20 is surrounded by a conical annular housing 45, the lower, larger outer diameter of which corresponds at least approximately to the diameter of the outlet chamber 41 and the upper, smaller outer diameter of which corresponds at least approximately to the diameter of the classifying wheel 8. The carrying arms 44 end at the conical wall of the annular housing 45 and are securely connected to this wall, which for its part is again part of the assembly comprising the outlet port 20 and the outlet chamber 41.

The carrying arms 44 and the annular housing 45 are parts of a flushing air device (not shown). The flushing air prevents the penetration of material from the interior of the classifier housing 21 into the gap between the classifying wheel 8, or more precisely the lower cover plate 3 thereof, and the outlet port 20. In order to allow this flushing air to enter the annular housing 45 and pass from there into the gap that is to be kept free, the carrying arms 44 are formed as tubes, are led with their outer end portions through the wall of the classifier housing 21 and are connected by way of an intake filter 46 to a flushing air source (not shown). The annular housing 45 is closed at the top by a perforated plate 47 and the gap itself may be adjustable by an axially adjustable annular disc in the region between the perforated plate 47 and the lower cover plate 33 of the classifying wheel 8.

The outlet from the outlet chamber 41 is formed by a fines discharge pipe 48, which is led from the outside into the classifier housing 21 and is connected tangentially to the outlet chamber 41. The fines discharge pipe 48 is a component part of the product outlet 6. A deflection cone 49 serves for cladding the entry of the fines discharge pipe 48 to the outlet chamber 41.

At the lower end of the conical housing end portion 38, a classifying air inlet spiral 50 and a coarse material discharge 51 are assigned in a horizontal arrangement to the housing end portion 38. The direction of rotation of the classifying air inlet spiral 50 is counter to the direction of rotation of the classifying wheel 8. The coarse material discharge 51 is removably assigned to the housing end portion 38, the lower end of the housing end portion 38 being assigned a flange 52 and the upper end of the coarse material discharge 51 being assigned a flange 53 and the two flanges 52 and 53 being releasably connected to one another in turn by known means when the air classifier 7 is ready for operation.

The dispersion zone to be designed is denoted by 54. Flanges that are machined (bevelled) on the inner edge for creating a smooth flow and a simple lining are denoted by 55.

Finally, an exchangeable protective tube 56 is also disposed on the inner wall of the outlet port 20 as a closure part and a corresponding protective tube 57 may be disposed on the inner wall of the outlet chamber 41.

At the beginning of operation of the classifier 7, in the operating state shown, classifying air is introduced by way of the classifying air inlet spiral 50 into the air classifier 7 under a pressure gradient and with an entry velocity chosen according to the purpose. As a result of the classifying air being introduced by means of a spiral, in particular in combination with the conicity of the housing end portion 38, the classifying air rises spirally upwards into the region of the classifying wheel 8. At the same time, the "product" comprising solid particles of differing mass is introduced by way of the product feed port 39 into the classifier housing 21. Of this product, the coarse material, i.e. the particle fraction of greater mass, passes into the region of the coarse material discharge 51, counter to the classifying air, and is made available for further processing. The fines, i.e. the particle fraction of lower mass, are mixed with the classifying air, pass radially from the outside inwards through the classifying wheel 8 into the outlet port 20, into the outlet chamber 41 and finally by way of a fines outlet pipe 48 into a fines outlet 58, and from there into a filter in which the operating medium in the form of a fluid, such as for example air, and fines are separated from one another.

Coarse constituents of the fines are removed radially from the classifying wheel 8 by centrifugal force and mixed with the coarse material in order to leave the classifier housing 21 with the coarse material or continue to circulate in the classifier housing 21 until they have become fines of such a particle size that they are discharged with the classifying air.

As a result of the abrupt cross-sectional widening from the outlet port 20 to the outlet chamber 41, a significant reduction in the flow velocity of the fines-air mixture takes place there. This mixture will therefore enter the fines outlet 58 through the outlet chamber 41 by way of the fines outlet pipe 48 with a much lower flow velocity and generate only a small amount of abrasive matter on the wall of the outlet chamber 41. For this reason, the protective tube 57 is also only a highly precautionary measure. The high flow velocity in the classifying wheel 8, for reasons of obtaining a good separating technique, still prevails however in the discharge or outlet port 20, for which reason the protective tube 56 is more important than the protective tube 57. Particularly significant is the change in diameter with diameter widening at the transition from the outlet port 20 into the outlet chamber 41.

Moreover, as a result of the subdivision of the classifier housing 21 in the way described and the assignment of the classifier components to the individual part-housings, the air classifier 7 can in turn be maintained well and components that have become faulty can be exchanged with relatively little effort and within short maintenance times.

Figure 3:
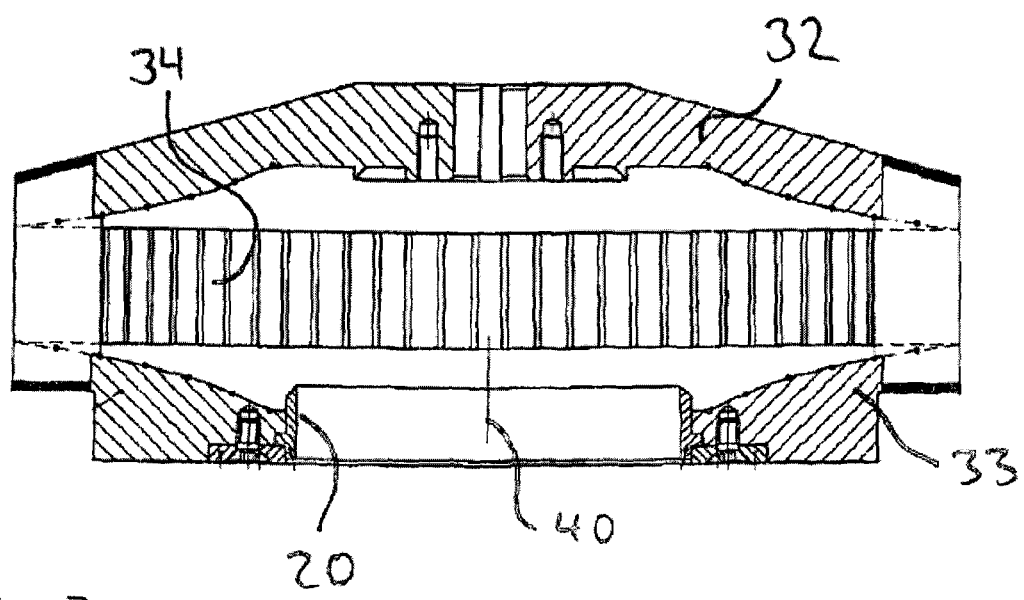
FIG. 3 shows a classifying wheel of an air classifier.

While in the schematic representation of FIG. 2 the classifying wheel 8 with the two cover plates 32 and 33 and the blade ring 59 arranged between them and having the blades 34 is still represented in a conventional form with cover plates 32 and 33 that are parallel and have parallel surfaces, in FIG. 3 the classifying wheel 8 is represented for a further exemplary embodiment of the air classifier 7 of an advantageous development.

The classifying wheel 8 according to FIG. 3 includes in addition to the blade ring 59 with the blades 34 the upper cover plate 32 and the lower cover plate 33 on the outflow side, at an axial distance from the said upper cover plate, and is rotatable about the axis of rotation 40, and consequently the longitudinal axis of the air classifier 7. The diametrical extent of the classifying wheel 8 is perpendicular to the axis of rotation 40, i.e. to the longitudinal axis of the air classifier 7, irrespective of whether the axis of rotation 40, and consequently the said longitudinal axis, is vertical or horizontal. The lower cover plate 33 on the outflow side concentrically encloses the outlet port 20. The blades 34 are connected to the two cover plates 33 and 32. Then, as a departure from the prior art, the two cover plates 32 and 33 are conically formed, to be precise preferably in such a way that the distance of the upper cover plate 32 from the cover plate 33 on the outflow side becomes greater from the ring 59 of the blades 34 inwards, i.e. towards the axis of rotation 40, and does so with preference continuously, such as for example linearly or non-linearly, and with further preference such that the surface area of the cylinder envelope through which flow passes remains constant for each radius between blade outlet edges and outlet port 20. The outflow velocity, which in the case of known solutions becomes less as a result of the radius becoming smaller, remains constant in the case of this solution.

Apart from the variant of the design of the upper cover plate 32 and the lower cover plate 33 that is explained above and in FIG. 3, it is also possible for only one of these two cover plates 32 or 33 to be conically formed in the way explained and the other cover plate 33 or 32 to be planar, as is the case for both cover plates 32 and 33 in connection with the exemplary embodiment according to FIG. 2. In particular, the form of the cover plate that has non-parallel surfaces may in this case be at least approximately such that the surface area of the cylinder envelope through which flow passes remains constant for each radius between blade outlet edges and outlet port 20.

In a specific embodiment of the process according to the invention, a surface modifying agent is added during the milling. The surface modification in the process according to the invention is particularly effective since, when the particles collide inside the mill, a cloud of material is formed from the milled, fine particles and the surface modifying agent can be introduced into this cloud, with particular preference can be sprayed in. As a result, the surface modifying agent does not come into contact with the walls of the mill during the binding reaction, so that caking is prevented. This caking represents a great disadvantage, and a great problem, of conventional mechanical or classifying mechanical mills. The surface modifying agent may be introduced with preference by means of nozzles, with preference two-fluid nozzles, wherein the atomizing medium may be the same medium as the milling gas. It may be preferred that the agent is injected through the nozzle directly within the milling zone, preferably at the same height as the milling nozzles.

One particular advantage of this type of surface modification is the fact that—as a result of the milling—active/fresh surfaces are available for the coating/doping virtually in situ. This increases the interaction of the surfaces of the material for milling with the coating/doping agent and leads, inter alia, to stronger binding. A further advantage may be that stabilizing of the material from milling (for example with respect to reagglomeration) may be achieved as a result of the simultaneous coating/doping during the milling.

In principle, all surface modifying agents that can be sprayed into the milling chamber under the milling conditions as a liquid, solution or melt may be used in the process according to the invention. Preferred surface modifying agents within the scope of the present invention are sodium silicate, alkali (for example NaOH and KOH), acids (example sulphuric acid, hydrochloric acid, nitric acid), organic silicon compounds (for example modified or non-modified silanes, polysiloxanes, organic modified polysiloxanes, silicone oils, silicone polyether acrylate), organic polymers, acrylate, polyvinyl alcohol (PVA), waxes (for example polyethylene waxes) and metal salts (doping). Some examples of such surface modifying agents, though not all, are given in WO 2004/055120, WO 2004/055105, WO 2004/054927 or EP 1477457. The disclosure of these documents is incorporated herein by reference in their entireties.

A surface covering is performed particularly advantageously with silicone polyether acrylate polymers, which are sold for example under the name TegoRad®. With particular preference, these are silicone polyether acrylate polymers or silicone polyether methacrylate polymers such as those described in EP 0999230 A1 and with most particular preference polymers corresponding to EP 0999230 A1 with a polyether excess of from 1 to 50% by weight, with preference 5 to 30% by weight, with particular preference 10 to 20% by weight. The subject matter of this laid-open patent application is incorporated herein by reference in its entirety.

With most particular preference, within the scope of the present invention, solids of amorphous $SiO_2$, in particular precipitated silicas, silicates (for example aluminosilicates), electric arc silica, pyrogenic silicas, semigels or silica gels may be milled in this variant of the process according to the invention and coated or doped with silicone polyether acrylates, polyvinyl alcohols (PVA), acrylates, waxes and metal salts. This combination of coating agent or doping agent and material for milling is particularly preferred because, in conventional processes, it has so far been necessary for coating or doping to be performed first and then milling in mechanical or classifying mechanical mills. The process according to the present invention has succeeded for the first time in combining coating or doping and milling in one step and nevertheless achieving a grain size distribution of the material from milling that is at least equivalent and often even superior to the conventional process with the mechanical or classifying mechanical mills. In comparison with conventional processes, this material combination on the one hand eliminates a step in the process, but on the other hand also achieves a superior product, since the process according to the invention leads to a lower proportion of the fines content in the grain size distribution and complete coating/doping of the surfaces of the material for milling.

Although, in principle, all organic and inorganic solids can be milled with the process according to the invention, the process offers particular advantages for amorphous oxides of metals of the 3rd and 4th main groups of the periodic table of elements. This applies both to the gels and to the amorphous solids with a different kind of structure. Precipitated silicas, pyrogenic silicas, electric arc silicas, silicates, semigels and silica gels are particularly preferred, with silica gels comprising not only hydrogels but also aerogels and xerogels. These materials are often used in applications, for example as a matting agent in paints, where exactly defined grain size distribution is important, and for example a fines content that is too high is harmful since the thickening properties are thereby impaired. In addition to the specific gain size distribution, low contamination with impurities, such as for example iron, is very advantageous in many applications. The process according to the invention has succeeded for the first time in producing amorphous oxides of metals of the 3rd and 4th main goups of the periodic table of elements, in particular silicon dioxides, with a specific grain size distribution in combination with a very low contamination with foreign elements.

Having generally described this invention, a further understanding can be obtained by reference to certain specific examples which are provided herein for purposes of illustration only, and are not intended to be limiting unless otherwise specified.

Measuring Methods

Determination of Particle Size by Means of Laser Diffraction

The use of laser diffraction for determining particle size distributions of powdery solids is based on the phenomenon that particles scatter or diffract the light of a monochrome laser beam with differing intensity patterns in all directions in dependence on their size. The smaller the diameter of the particles impinged by the beam, the greater the scattering or diffracting angles of the monochrome laser beam.

The following way of carrying out the measurement is described on the basis of precipitated silica samples.

In the case of hydrophilic precipitated silicas, sample preparation and measurement was performed with fully deionized water as the dispersing fluid, while pure ethanol was used in the case of precipitated silicas that could not be adequately wetted with water. Before the beginning of the measurement, the LS 230 laser diffraction particle size analyzer (from Beckman Coulter; measuring range: 0.04-2000 µm) and the fluid module (Small Volume Module Plus, 120 ml, from Beckman Coulter) were allowed to warm up for 2 h and the module was rinsed three times with fully deionized water. For measuring hydrophobic precipitated silicas, the rinsing operation was carried out with pure ethanol.

In the analyzer software of the LS 230 laser diffraction particle size analyzer, the following optical parameters that are relevant for an evaluation on the basis of the Mie theory were stored in a file:

Diffraction index of the dispersing fluid D. I. $real_{water}$=1.332 (1.359 for ethanol)

Diffraction index of the solid (sample material) $real_{silica}$=1.46

Imaginary=0.1

Shape factor=1

Furthermore, the following parameters that are relevant for the particle measurement were set:

Measuring time=60 s

Number of measurements=1

Pumping speed=75%

Depending on the nature of the sample, it was introduced into the fluid module (Small Volume Module Plus) of the analyzer directly as a powdery solid by means of a spatula or in a suspended form by means of a 2 ml disposable pipette. When the sample concentration required for the measurement was reached (optimum optical obscuration), the software of the LS 230 laser diffraction particle size analyzer indicated "OK". Milled precipitated silicas were dispersed by exposure to ultrasound for 60 s by means of the Vibra Cell VCX 130 from Sonics with a CV 181 ultrasound converter and a 6 mm ultrasonic tip at 70% amplitude and simultaneous pumping circulation in the fluid module. In the case of unmilled precipitated silicas, the dispersion was performed without exposure to ultrasound by pumping circulation in the fluid module for 60 s.

The measurement was performed at room temperature. From the raw data, the analyzer software calculated the volume distribution of the particle sizes and the $d_{50}$ value (median value) on the basis of the Mie theory and with the aid of the previously established optical parameters.

ISO 13320 "Particle Size Analysis—Guide to Laser Diffraction Methods" describes details of the method of laser diffraction for determining particle size distributions. A person skilled in the art may find a list there of the optical parameters of commonly used solids and dispersing fluids that are relevant for an evaluation on the basis of the Mie theory.

It is merely by way of example that the invention is presented in the description and represented in the drawing on the basis of the exemplary embodiments, and it is not restricted to these but rather comprises all variations, modifications, substitutions and combinations that a person skilled in the art can take from the present documents, in particular within the scope of the claims and the general presentations in the introductory part of this description, as well as the description of the exemplary embodiments and the representations thereof in the drawing, and combine with his expert knowledge and the prior art. In particular, all the individual features and possibilities for refining the invention and the various ways of implementing it can be combined.

EXAMPLE 1

In an AFG 200 Aeroplex fluidized-bed opposed-jet mill, from Hosokawa Alpine AG, ACEMATT® HK400, from Evonik Degussa GmbH, was milled under a milling air inlet temperature of 76° C. (milling chamber interior temperature=60° C.) and a pressure of 0.4 bar (abs) and covered with the Tego® Rad 2300 silicone polyether acrylate. This involved injecting the coating agent into the mill by way of a two-fluid nozzle (not depicted in FIGS. 1 to 3) located in the same plane as the milling nozzles (3 milling nozzles spaced apart by 120° and the two-fluid nozzle at 60° between these milling nozzles). 7.4 percent by mass of Tego® Rad 2300 (Tego® Rad 2300 has a carbon content of about 43.9% by weight) was fed in. In the end product, a carbon content of 3.2% by weight was found, i.e., taking into consideration the carbon content of Tego® Rad 2300, something of a quantitative covering was achieved without loss of polyether. With wet coating and adding the same percentage of Tego® Rad 2300, only between 2.5 and 2.8% by weight of carbon was found in the end product. Consequently, in the case of wet coating, a considerable amount of the surface modifying agent is not on the silica but was washed out with the water. This shows the particular advantage of the process according to the invention in the covering of carrier materials with surface modifying agents with water-soluble fractions. The product had a $d_{50}$ value of 4.7 μm.

EXAMPLE 2

Sipernat® 50, from Evonik Degussa GmbH, was covered in a fluidized-bed opposed-jet mill, type CGS 50, from Netzsch-Condux, under a milling air temperature of 80° C. and a pressure of 0.36 bar (abs) and with PE Wax from Deurex (melting range: 98-103° C.). The coating was performed in a way analogous to Example 1. The product had a $d_{50}$ value of 5.8 μm.

EXAMPLE 3

The abrasive toothpaste silica Sident® 9 from Evonik Degussa GmbH was milled once by the process according to the invention in the fluidized-bed opposed-jet mill, type CGS 50, from Netzsch-Condux, as in Example 2. Alternatively, Sident® 9 was milled in a UPZ 160 mechanical beater mill, from Alpine. With an average throughput of about 600 kg, the mechanical beater mill produced abrasive matter of about 6.5 g, corresponding to an increase in the iron impurity of 11 ppm. In the case of the milling according to the invention, the increase in the iron impurity was less than 1 ppm.

LIST OF DESIGNATIONS IN THE FIGURES

1: jet mill
2: cylindrical housing
3: milling chamber
4: material-for-milling feed
5: milling jet inlet
6: product outlet
7: air classifier
8: classifying wheel
9: inlet opening or inlet nozzle
10: milling jet
11: heating source
12: heating source
13: feeding pipe
14: temperature-insulating jacket
15: inlet
16: outlet
17: centre of the milling chamber
18: reservoir or generating device, with preference a blower
19: directing devices
20: outlet port
21: classifier housing
22: upper housing part
23: lower housing part
24: circumferential flange
25: circumferential flange
26: articulated joint
27: arrow
28: classifying chamber housing
28a: carrying arms
29: discharge cone
30: flange
31: flange
32: cover plate
33: cover plate
34: blade
35: classifying wheel shaft
35a: rotary bearing
36: upper machined plates
37: lower machined plate
38: housing end portion
39: product feed port
40: axis of rotation
41: outlet chamber
42: upper cover plate
43: removable cover
44: carrying arms
45: conical annular housing
46: intake filter
47: perforated plate
48: fines discharge pipe
49: deflection cone
50: classifying air inlet spiral
51: coarse material discharge
52: flange
53: flange
54: dispersion zone
55: flanges machined (bevelled) on the inner edge and lining
56: exchangeable protective tube
57: exchangeable protective tube
58: fines outlet
59: blade ring

The invention claimed is:

1. A process for generating fine particles of a material, comprising:
    feeding the material to a milling chamber of a jet mill;
    generating a milling gas medium with a rotary blower or a radial blower and directing the generated milling gas medium through at least one fluid nozzle into the milling chamber;
    impinging the material with the milling gas medium in the milling chamber to obtain a milling product comprising coarse and fine grains;
    passing the milling product to a dynamic air classifier;
    separating the fine grains from the coarse grains in the dynamic air classifier;
    removing the fine grains from the dynamic air classifier and collecting the fine grains; and
    returning the coarse grains to the milling chamber;
    wherein a pressure of the milling gas medium is less than or equal to 4 bar (abs) and a temperature of the milling gas is less than 100° C.

2. The process according to claim 1, wherein the jet mill is an oval tube mill or a spiral jet mill.

3. The process according to claim 1, wherein the jet mill is a fluidized-bed opposed-jet mill or a dense-bed jet mill, integrated with a dynamic air classifier.

4. The process according to claim 3, wherein the fine grains are passed through a fines outlet chamber of the dynamic air classifier, and a cross-section of the outlet chamber is increasingly wider in a direction of flow.

5. The process according to claim 1, wherein
    in the separation of the coarse and fine grains, the grains are passed through a classifying rotor or a classifying wheel of the dynamic air classifier having a clearance height that is constant or increases with decreasing radius, so that a surface area of the classifying rotor or wheel is approximately constant.

6. The process according to claim 5, wherein the dynamic air classifier comprises a classifying rotor or classifying wheel with an immersion tube, which rotates with the classifying rotor or the classifying wheel.

7. The process according to claim 1, wherein the milling gas medium comprises at least one gas selected from the group consisting of air, argon, helium, nitrogen and other noble gas.

8. The process according to claim 1, further comprising:
adding a coating agent or doping agent to the milling;
wherein at least a part of a surface of the particles of the material for milling are covered with the coating agent or doping agent.

9. The process according to claim 1, wherein the temperature of the milling gas is less than or equal to 95° C.

10. The process according to claim 1 wherein the pressure of the milling gas is less than 3 bar.

11. The process according to claim 1, wherein the milling gas pressure is 0.15 to 0.5 bar and the milling gas temperature is 15 to 80° C.

\* \* \* \* \*